Patented Mar. 10, 1942

2,276,041

UNITED STATES PATENT OFFICE 2,276,041

METHOD OF MANUFACTURING CHLOROSULPHONATES

Ralph K. Iler, Cleveland Heights, Ohio, assignor to E. I. du Pont de Nemours & Company, Wilmington, Del., a corporation of Delaware No Drawing. Application November 3, 1939, Serial No. 302,669

4 Claims. (Cl. 23—50)

This invention relates to processes for producing chlorosulphonates, and is more particularly directed to processes wherein a chlorosulphonate is produced by reacting a chloride with a gaseous mixture comprising sulphur trioxide, hydrogen chloride and chlorosulphonic acid vapor, the amount of hydrogen chloride and chlorosulphonic acid vapor combined being not less than about 0.05% by volume of the sulphur trioxide.

Sodium chlorosulphonate has already been produced by effecting a reaction between common salt and liquid chlorosulphonic acid whereby the sodium chlorosulphonate is obtained as a precipitate and hydrogen chloride gas is evolved as a by-product in stoichiometric proportions. This method is subject to great inconvenience in that if an excess of liquid chlorosulphonic acid is used the separation of the sodium chlorosulphonate from the chlorosulphonic acid presents difficult problems of technique, and if no excess of chlorosulphonic acid is used, the reaction is incomplete and the product is of non-uniform composition and in a physical form which makes it difficult to handle. The formation of hydrogen chloride as a by-product is often not desired and disposal of this gas also presents a problem.

Another method which has been proposed for making sodium chlorosulphonate is by the reaction of concentrated oleum on common salt. The substitution of oleum for chlorosulphonic acid in the process previously described avoids the difficulties accompanying the formation of by-product hydrogen chloride, but is undesirable because it introduces sodium sulphate or sodium hydrogen sulphate into the product in proportion to the amount of sulphuric acid in the oleum used.

Laboratory experiments have been described in which sodium chlorosulphonate was produced in a desirable physical form by exposing an inert mass of finely divided salt to sulphur trioxide vapor. Some sodium chlorosulphonate was formed in these experiments, but the rate of formation was very slow, three days being required to effect a substantially complete reaction.

Now I have found that one may accelerate the rate of reaction between metallic chlorides and gaseous sulphur trioxide to form metallic chlorosulphonates by adding to the sulphur trioxide a minor amount, but not less than about 0.05% by volume, of hydrogen chloride and chlorosulphonic acid vapor.

A number of possible explanations can be offered for this accelerating effect of hydrogen chloride-chlorosulphonic acid vapor on the reaction between sulphur trioxide and chlorides which I have observed. It may be that the hydrogen chloride and chlorosulphonic acid do not enter into the reaction but merely catalyze it by their presence. A more plausible explanation would seem to be that the hydrogen chloride or chlorosulphonic acid or both enter into intermediate reaction and are continuously regenerated, thus functioning as promoters of the reaction. It must be understood that the scope of my invention is not to be limited by the adoption of these or other explanations of the accelerating effect of the hydrogen chloride-chlorosulphonic acid vapor.

I have further observed that when either hydrogen chloride or chlorosulphonic acid vapor is added to gaseous sulphur trioxide in the presence of a metallic chloride such that the sulphur trioxide will act upon the metallic chloride to form a chlorosulphonate, the gas phase of the reaction mixture ultimately contains both hydrogen chloride and chlorosulphonic acid vapor. It appears that under such conditions hydrogen chloride and chlorosulphonic acid vapor are in equilibrium with each other. The state of the equilibrium varies with the conditions of the reaction so that either the hydrogen chloride or the chlorosulphonic acid vapor may be present in predominant amounts. This observed equilibrium between hydrogen chloride and chlorosulphonic acid vapor may perhaps be explained by theorizing that hydrogen chloride reacts with sulphur trioxide to form chlorosulphonic acid vapor that the chlorosulphonic acid vapor reacts with the metallic chloride present to form a metallic chlorosulphonate, and that the hydrogen chloride is regenerated by this reaction. Whatever may be the explanation, the effect at least is one of equilibrium.

The concentrations of hydrogen chloride and chlorosulphonic acid vapor which I may use in a process of my invention may conveniently be referred to in terms of the per cent by volume of the sulphur trioxide which the combined hydrogen chloride and chlorosulphonic acid vapor represent. If diluent inert gases such as nitrogen are present in the sulphur trioxide, the percentage of the total volume of gas represented by the combined hydrogen chloride and chlorosulphonic acid vapor is decreased in proportion to the decrease of the sulphur trioxide content, but the ratio of combined hydrogen chloride-chlorosulphonic acid vapor to sulphur trioxide remains unchanged.

The accelerating effect of hydrogen chloride and chlorosulphonic acid vapor on the reaction between gaseous sulphur trioxide and metallic chlorides becomes pronounced only when the concentration of these combined gases is above about 0.05% of the volume of the sulphur trioxide in the gas used. Even traces of hydrogen chloride-chlorosulphonic acid vapor will accelerate the attack of the gaseous sulphur trioxide or chlorides, but I have found that the presence of more than mere traces is necessary if the reaction is to proceed at a rate which renders the operation commercially feasible. On the other hand, I have found that the presence of large amounts of hydrogen chloride-chlorosulphonic acid vapor is neither advantageous nor desirable in commercial operations, since these gases are not taken up in the reaction as pointed out above, and hence expensive recovery systems must be provided if the amounts involved represent any considerable economic value. Moreover, if large volumes of either hydrogen chloride or chlorosulphonic acid vapor are to be added to the reaction chamber, it is necessary that a separate source of these gases be provided, whereas if small amounts only are used, the presence of such amounts can be accomplished by adding moisture or some other water-bearing substance which will react with the metal chloride and sulphur trioxide to release hydrogen chloride in situ. By this method the chlorosulphonate product is contaminated with sulphates, but if the amount of hydrogen chloride generated is small, the sulphate contamination will be correspondingly small. Under most conditions I have found that satisfactory results are obtained when the combined hydrogen chloride-chlorosulphonic acid vapor content is about from 0.5 to 5% by volume of the sulphur trioxide present and more particularly I prefer to use from about 0.2% to about 2% by volume of the sulphur trioxide.

My novel processes for making chlorosulphonates in the presence of hydrogen chloride-chlorosulphonic acid vapor are particularly well adapted to methods wherein a chloride is subjected to attrition in the presence of sulphur trioxide gas or wherein reaction is effected by suspending a finely divided chloride in gaseous sulphur trioxide. In either of these methods the reaction rate governs the rate at which the sulphur trioxide is absorbed by the chloride. I have found that sulphur trioxide is absorbed much more rapidly under such conditions when hydrogen chloride and chlorosulphonic acid vapor is present.

A clearer understanding of the manner of applying a process of my invention to the production of a chlorosulphonate may be derived from the following illustrative example:

Example

To make sodium chlorosulphonate from common salt, sodium chloride, 100 pounds of salt is charged into a ball mill and subjected to the usual grinding action of the ball mill. A dry gas containing sulphur trioxide is passed into the ball mill, a suitable vent being provided for unabsorbed gas. Under such conditions it is found that only 10 pounds of sulphur trioxide can be absorbed per hour. However, when 1% of hydrogen chloride gas is added to the sulphur trioxide so as to conduct the reaction in the presence of hydrogen chloride and chlorosulphonic acid vapor, it is found that the rate at which sulphur trioxide can be absorbed is increased to at least 20 pounds per hour.

In a process of my invention, it is only necessary that the hydrogen chloride-chlorosulphonic acid vapor be present in the sulphur trioxide at the time contact between the metallic chloride and the sulphur trioxide is effected; it is not necessary that the gas mixture be added as such to the sulphur trioxide. It will be readily apparent to those skilled in the art that under reaction conditions here involved a variety of methods for effecting the presence of hydrogen chloride during the reaction may be employed. For instance, moisture stoichiometrically equivalent to the amount of hydrogen chloride desired may be added to the sulphur trioxide, since sulphur trioxide in the presence of moisture reacts with chlorides to form hydrogen chloride. Alternatively, suitable amounts of sulphuric acid or oleum may be incorporated into the salt at the time the reaction is initiated, since under the temperature conditions of the reaction, hydrogen chloride will be released. Still another method of introducing hydrogen chloride-chlorosulphonic acid vapor is to add an organic compound containing hydrogen and oxygen, such as alcohol or sugar, which will be decomposed by the sulphur trioxide to form moisture which in turn reacts as already indicated.

Temperatures in the range of from about 50 to 100° C. are usually preferable in reacting chlorides with sulphur trioxide to make chlorosulphonates. However, when a hydrogen chloride-chlorosulphonic acid vapor mixture is present according to the teachings of this invention, temperatures from about 30 to 150° C. may be employed.

The presence of hydrogen chloride in chlorosulphonic acid vapor accelerates the reaction of gaseous sulphur trioxide with any metallic chloride such as sodium chloride. I have also found that ammonium chloride may be classed with the metallic chlorides with respect to its reaction with $SO_3$ in the presence of hydrogen chloride-chlorosulphonic acid vapor.

Although I have described my invention with relation to typical applications, it should be understood that without departing from the spirit of my invention one skilled in the art may employ numerous processes wherein a chloride is reacted with gaseous sulphur trioxide in the presence of hydrogen chloride and chlorosulphonic acid vapor.

I claim:

1. In a process for the production of a chlorosulphonate, the step comprising reacting a chloride with gaseous sulphur trioxide in the presence of a minor amount of vapors of added hydrogen chloride and chlorosulphonic acid, the amount so added being not substantially less than five hundredths per cent of the volume of sulphur trioxide.

2. In a process for the production of sodium chlorosulphonate, the step comprising reacting sodium chloride with gaseous sulphur trioxide in the presence of a minor amount of vapors of added hydrogen chloride and chlorosulphonic acid, the amount so added being not substantially less than five hundredths per cent of the volume of sulphur trioxide.

3. In a process for the production of ammonium chlorosulphonate, the step comprising reacting ammonium chloride with gaseous sulphur trioxide in the presence of a minor amount of vapors of added hydrogen chloride and chlorosulphonic acid, the amount so added being not substantially less than five hundredths per cent of the volume of sulphur trioxide.

4. In a process for the production of a chlorosulphonate, the step comprising reacting a chloride with gaseous sulphur trioxide at a temperature about from 50 to 100° C. and in the presence of a minor amount of vapors of added hydrogen chloride and chlorosulphonic acid, the amount so added being about from five hundredths to two per cent of the volume of sulphur trioxide.

RALPH K. ILER.